(12) United States Patent
Erikawa

(10) Patent No.: US 8,466,988 B2  
(45) Date of Patent: Jun. 18, 2013

(54) IMAGE PICKUP APPARATUS HAVING ZOOM FUNCTION

(75) Inventor: Kazuhiko Erikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/310,300

(22) Filed: Dec. 2, 2011

(65) Prior Publication Data

US 2012/0147222 A1  Jun. 14, 2012

(30) Foreign Application Priority Data

Dec. 10, 2010 (JP) .................................. 2010-275776

(51) Int. Cl.
 *H04N 5/262* (2006.01)
 *G03B 17/00* (2006.01)

(52) U.S. Cl.
 USPC ........................................ 348/240.99; 396/85

(58) Field of Classification Search
 USPC ............... 348/240.1–240.3, 335; 396/72, 77, 396/85–87
 See application file for complete search history.

(56) References Cited

U.S. PATENT DOCUMENTS 5,148,199 A * 9/1992 Kohmoto et al. ............... 396/86

FOREIGN PATENT DOCUMENTS

JP 2008-309880 12/2008

* cited by examiner

*Primary Examiner* — Timothy J Henn
(74) *Attorney, Agent, or Firm* — Cowan, Liebowitz & Latman, P.C.

(57) ABSTRACT

An image pickup apparatus that is capable of changing a zoom speed in a wide range in accordance with an amount of movement of a zoom lever without oversizing the zoom lever, and has excellent operability of the zoom lever. An amount of change of zoom speed relative to an amount of movement of the zoom lever during when the zoom lever is operated from a first neutral position in a first or second direction differs from that during when the zoom lever is operated from a second neutral position in the first or second direction. Thus, the zoom speed can be varied in a wide range according to the amount of movement of the zoom lever, while ensuring the operability of the zoom lever.

10 Claims, 6 Drawing Sheets

IMAGE PICKUP APPARATUS HAVING ZOOM FUNCTION

BACKGROUND OF THE INVENTION

1. Field of the Invention

The present invention relates an image pickup apparatus having a zoom function.

2. Description of the Related Art

Some of image pickup apparatuses such as digital video cameras and digital still cameras have an optical zoom function for changing focal distance (i.e., zoom magnification) by moving a zoom lens and/or an electronic zoom function for changing zoom magnification by electronically enlarging or reducing shot image. Such image pickup apparatus has a zoom lever for changing zoom speed (i.e., zoom magnification change speed). The zoom speed generally increases with increase of an amount of movement of the zoom lever. By operating the zoom lever, a user can select a desired zoom speed to set a desired zoom magnification (photographic view angle).

In recent years, image pickup apparatuses have been demanded to be downsized. To that end, the zoom lever has also been downsized. However, it is difficult for a user to finely adjust the amount of movement of a small-sized zoom lever to finely set the zoom speed.

Thus, there has been proposed an image pickup apparatus in which the zoom lever can be pressed down from a normal position to a maximum zoom speed position, whereby a zoom speed change range in the normal position of zoom lever (not including a maximum zoom speed) can be made narrow. With this arrangement, an amount of zoom speed change relative to an amount of zoom lever movement can be made small in the normal zoom lever position, whereby the operability can be improved. However, there is a fear that a user unintentionally presses down the zoom lever.

Also proposed is an image pickup apparatus having a zoom lever that can be pressed down to switch a zoom mode between optical zoom mode and electronic zoom mode, so as to select one of zoom speeds corresponding to the two zoom modes (Japanese Laid-open Patent Publication No. 2008-309880). However, also with this proposed apparatus, a user unintentionally presses down the zoom lever in some cases. In addition, the zoom speed cannot be changed according to the amount of movement of the zoom lever by the arrangement in which one of the zoom speeds corresponding to the two zoom modes is selected.

SUMMARY OF THE INVENTION

The present invention provides an image pickup apparatus that is capable of changing the zoom speed in a wide range in accordance with an amount of movement of a zoom lever without oversizing the zoom lever, and has excellent operability of the zoom lever.

According to the present invention, there is provided an image pickup apparatus, which comprises a zoom lever configured to be operable from a first neutral position in first and second directions, configured to be operable from the first neutral position to a second neutral position in a third direction that is different from the first and second directions, and configured to be operable from the second neutral position in the first and second directions, and a control unit configured to control a zoom speed in a first zoom mode based on an amount of movement of the zoom lever in a case where the zoom lever is operated from the first neutral position in the first or second direction and configured to control the zoom speed in a second zoom mode based on the amount of movement of the zoom lever in a case where the zoom lever is operated from the second neutral position in the first or second direction, wherein an amount of change of the zoom speed relative to the amount of movement of the zoom lever in the first zoom mode differs from that in the second zoom mode.

With the present invention, the zoom speed can be changed in a wide range in accordance with the amount of movement of the zoom lever without oversizing the zoom lever, and the operability of the zoom lever can be improved.

Further features of the present invention will become apparent from the following description of an exemplary embodiment with reference to the attached drawings.

DESCRIPTION OF THE EMBODIMENTS

The present invention will now be described in detail below with reference to the drawings showing a preferred embodiment thereof.

Figure 1:
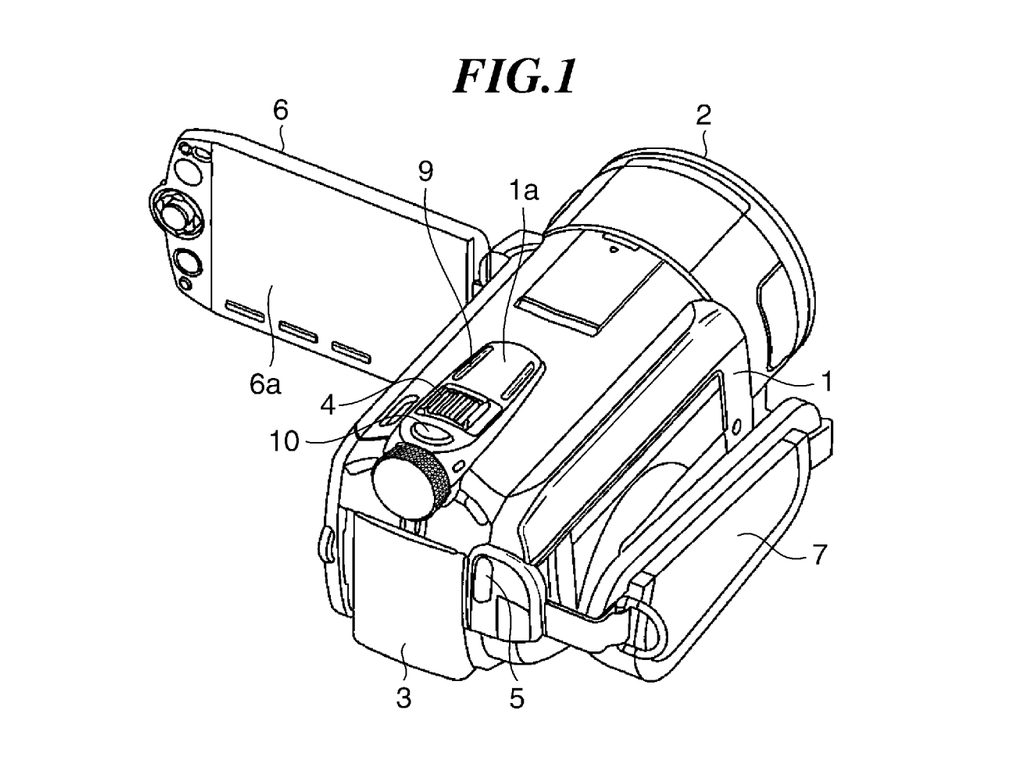
FIG. 1 is a perspective rear view showing a digital video camera, which is an example of an image pickup apparatus according to one embodiment of this invention.

FIG. 1 shows a digital video camera in perspective rear view, the camera being an example of an image pickup apparatus according to one embodiment of this invention.

As show in FIG. 1, the digital video camera of this embodiment has a camera body 1 having a front side on which there is a taking lens 2 and a rear side on which there are a battery pack 3 and a trigger button 5. On a rear upper surface of the camera body 1, a zoom operation unit 1a is provided that includes a finger hook member 9, zoom lever 4, and photo button 10, which are disposed in this order as viewed from front to rear of the camera body 1.

A display unit 6 is supported by a hinge on the left side of the camera body 1 so as to be openable and closable. When the display unit 6 is in an open state, a liquid crystal panel 6a of the display unit 6 is disposed facing a photographer. Thus, the photographer can operate the trigger button 5 to start or stop shooting, while confirming a shot image displayed on the liquid crystal panel 6a.

A grip belt 7 is provided on the right side of the camera body 1. The photographer can hold the camera body 1 with one hand placed between the camera body 1 and the grip belt 7. At that time, the user's forefinger is put on the zoom lever 4 and the middle finger is put on the finger hook member 9 of the zoom operation unit 1a.

Next, an example operation of the zoom lever 4 will be described with reference to FIGS. 2 to 4.

Figure 2:
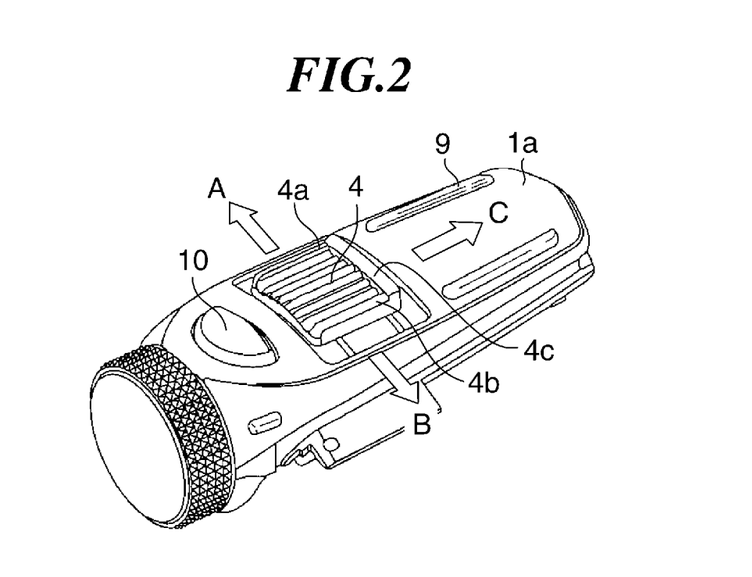
FIG. 2 is a fragmentary perspective view showing a zoom operation unit of the digital video camera in a state where a zoom lever of the digital video camera is at a first neutral position.
Figure 3:
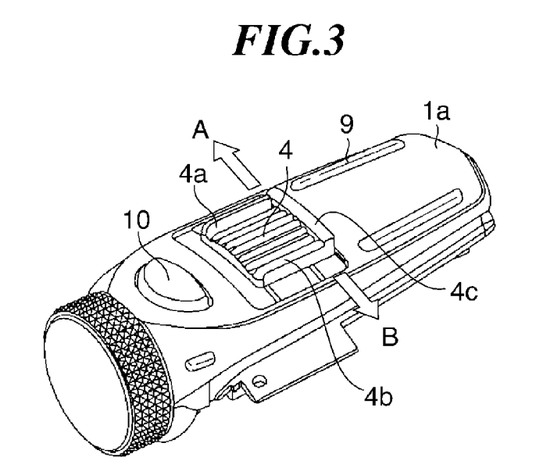
FIG. 3 is a fragmentary perspective view showing the zoom operation unit in a state where the zoom lever slidingly moved from the first neutral position in an arrow C direction in FIG. 2 reaches a second neutral position.

FIG. 2 shows in fragmentary perspective view the zoom operation unit 1a in a state where the zoom lever 4 is at a first neutral position. FIG. 3 shows in fragmentary perspective view the zoom operation unit 1a in a state where the zoom lever 4 slidingly moved from the first neutral position in an arrow C direction in FIG. 2 reaches a second neutral position. FIG. 4 is a graph showing a relation between zoom speed and slide movement amount at a first zoom operation in which the zoom lever 4 is slid from the first neutral position in arrow A and B directions in FIG. 2 and showing a relation between zoom speed and slide movement amount at a second zoom operation in which the zoom lever 4 is slid from the second neutral position in arrow A and B directions in FIG. 3.

As shown in FIG. 2, the zoom lever 4 can be slidingly operated from the first neutral position in a forward direction (i.e., in the arrow C direction), and can be slidingly operated from the first neutral position in the arrow A and B directions (i.e., to the left and right as viewed from the photographer), which are perpendicular to the arrow C direction. The arrow A, B and C directions are an example of first, second, and third directions that are used to define this invention.

Ribs 4a, 4b extending in the arrow C direction are respectively formed on the arrow A direction side and on the arrow B direction side of the zoom lever 4, and a rib 4c extending in the arrow A and B directions is formed on the front side of the zoom lever 4 in the arrow C direction. The ribs 4a to 4c serve as finger hooks when the zoom lever 4 is operated in the arrow A, B, or C direction, thereby improving the operability.

The taking lens 2 is zoomed to the wide-angle end side when the zoom lever 4 is slidingly operated from the first neutral position in the arrow A direction, and zoomed to the tele-angle end side when the zoom lever 4 is slidingly operated from the first neutral position in the arrow B direction.

During the first zoom operation in which the zoom lever 4 is slidingly operated from the first neutral position in the arrow A and B directions, the zoom speed in the arrow A or B direction varies depending on the amount of slide movement of the zoom lever 4. Specifically, the zoom speed becomes slower as the amount of slide movement of the zoom lever 4 becomes smaller, and becomes faster as the amount of slide movement of the zoom lever 4 becomes larger.

The zoom lever 4 is slidingly movable in the arrow C direction from the first neutral position of FIG. 2 as previously described, so that the zoom lever 4 can reach the second neutral position. It should be noted that the zoom lever 4 is also slidingly movable from the second neutral position to the first neutral position. As shown in FIG. 3, the zoom lever 4 is slidingly movable in the arrow A or B direction from the second neutral position.

The taking lens 2 is zoomed to the wide-angle end side when the zoom lever 4 is slidingly operated from the second neutral position in the arrow A direction, and zoomed to the tele-angle end side when the zoom lever 4 is slidingly operated from the second neutral position in the arrow B direction.

During the second zoom operation in which the zoom lever 4 is slidingly operated from the second neutral position in the arrow A and B directions, the zoom speed in the arrow A or B direction varies depending on the amount of slide movement of the zoom lever 4. Specifically, the zoom speed becomes slower as the amount of slide movement of the zoom lever 4 becomes smaller, and becomes faster as the amount of slide movement of the zoom lever 4 becomes larger.

An amount of change of zoom speed relative to the amount of slide movement of the zoom lever 4 is smaller in the second zoom operation than in the first zoom operation.

Accordingly, to finely adjust the photographic view angle, it is preferable to perform the second zoom operation in which the zoom lever 4 is slidingly moved in the arrow A or B direction from the second neutral position, whereby a desired photographing view angle can easily be attained.

On the other hand, to largely change the photographic view angle or to change the photographic view angle to the wide-angle end or to the tele-angle end, it is preferable to perform the first zoom operation in which the zoom lever 4 is slidingly moved in the arrow A or B direction from the first neutral position, whereby a desired photographing view angle can immediately be attained.

Figure 4:
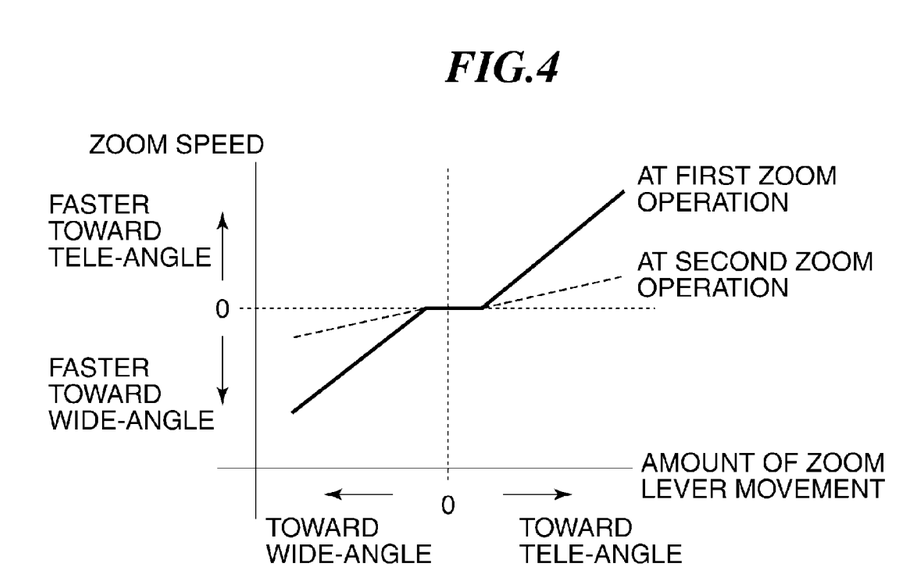
FIG. 4 is a graph showing a relation between zoom speed and amount of slide movement at a first zoom operation where the zoom lever is slid from the first neutral position in arrow A and B directions in FIG. 2 and a relation between zoom speed and amount of slide movement at a second zoom operation where the zoom lever is slid from the second neutral position in arrow A and B directions in FIG. 3.

As shown in FIG. 4, there is a dead zone in which the zoom speed has a value of 0 when the zoom lever 4 is within a minute slide movement range, thereby preventing an erroneous zooming operation from being caused when the photographer unintentionally touches the zoom lever 4.

Figure 5:
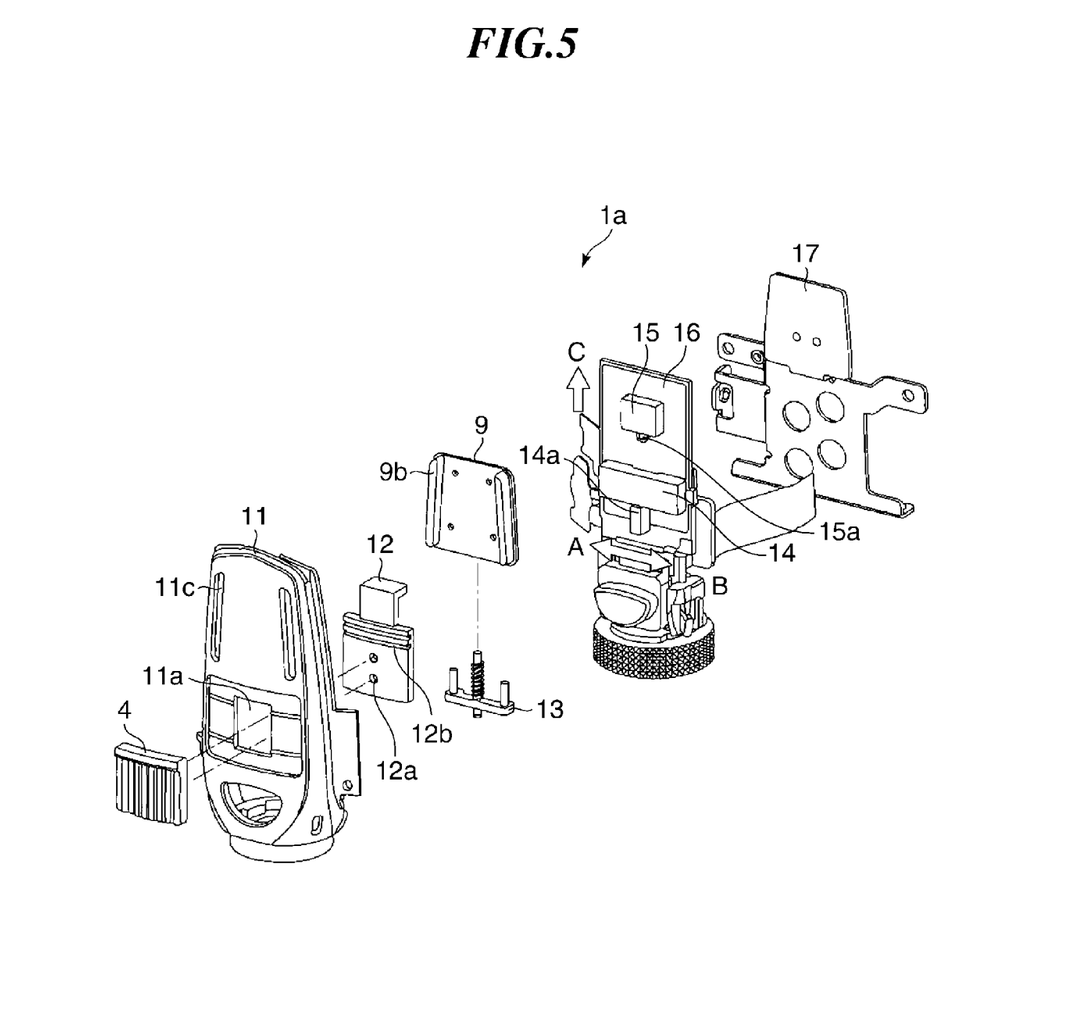
FIG. 5 is an exploded perspective view of a zoom operation unit of the digital video camera as seen from a front surface side.
Figure 6:
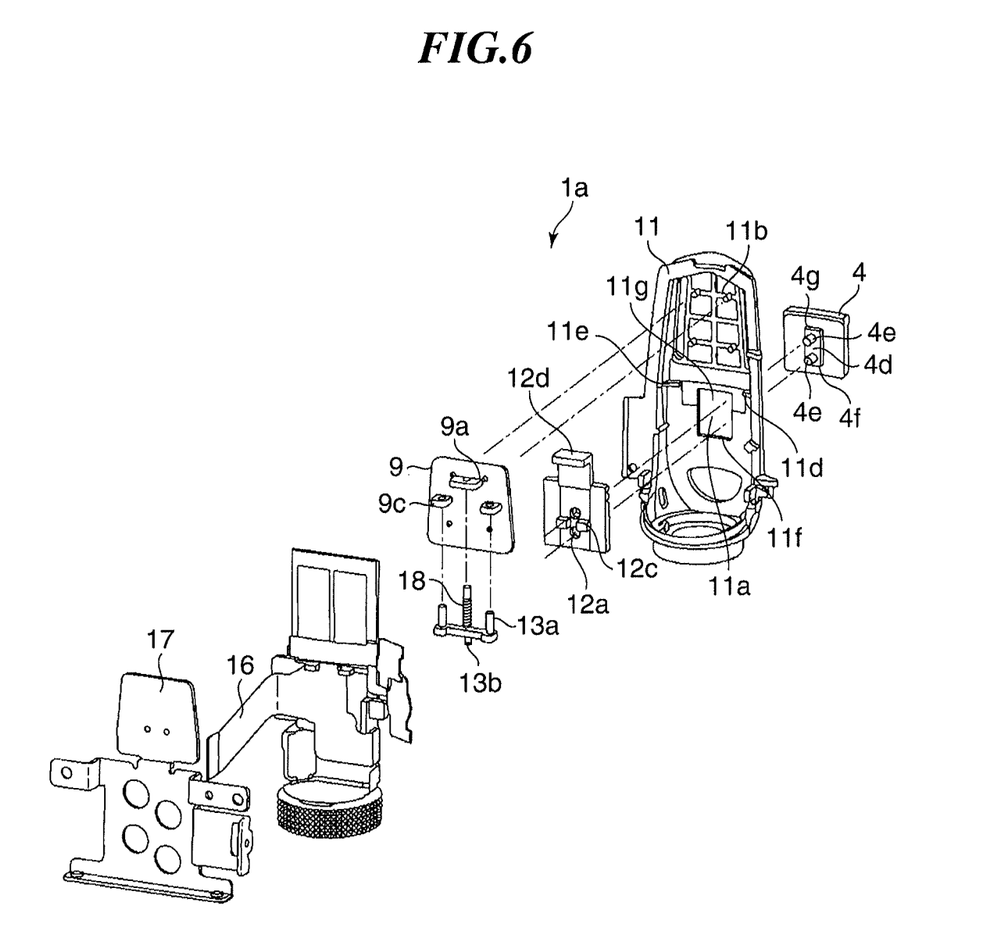
FIG. 6 is an exploded perspective view of the zoom operation unit as seen from a rear surface side.

Next, an example construction of the zoom operation unit 1a will be described with reference to FIGS. 5 and 6. FIGS. 5 and 6 show the zoom operation unit 1a in exploded perspective view as seen from front and rear surface sides, respectively.

As shown in FIGS. 5 and 6, a zoom cover 11 is formed with a rectangular hole 11a through which pins 4e formed on the zoom lever 4 extend for engagement with holes 12a formed in a holding member 12.

A rectangular protrusion 4d whose height is larger than a thickness of the zoom cover 11 is formed at the roots of the pins 4e of the zoom lever 4. Between the zoom lever 4 and the holding member 12, a gap is defined in which the zoom cover 11 is disposed.

The rectangular protrusion 4d of the zoom lever 4 is loosely fitted into the hole 11a of the zoom cover 11. Between an outer periphery of the protrusion 4d and the hole-formed portion of the zoom cover 11, there is defined a space that allows sliding movements of the zoom lever 4 in the arrow A, B, or C direction in FIG. 2.

A pair of ribs 9b extending in the arrow C direction are formed on the front surface of the finger hook member 9. These ribs 9b are respectively inserted through a pair of elongated holes 11c in the zoom cover 11 so as to project toward the front surface of the zoom cover 11. Pins 11b formed on the zoom cover 11 are fitted into holes 9a formed in the finger hook member 9.

At three places on the rear surface of the finger hook member 9, ribs 9c are provided, each of which is formed with a hole extending through the rib 9c in the arrow C direction. A pressing member 13 is provided with three guide rods 13a respectively inserted through the holes formed in the ribs 9c. A compression coil spring 18 that urges the zoom lever 4 toward the first neutral position is fitted on the central one of the three guide rods 13a. The compression coil spring 18 is an example of an urging member of this invention.

The zoom operation unit 1a is fixed to the camera body 1 through a base member 17 that holds a flexible board 16 on which a zoom switch 14 and a mode switch 15 are mounted.

The zoom switch 14 is implemented by a self-reset slide volume switch having a movable actuator 14a. The actuator 14a is held between two protrusions 12c provided on the rear surface of the holding member 12, and is coupled to the zoom lever 4 through the holding member 12. When the zoom lever 4 is slidingly operated in the arrow A or B direction, the actuator 14a moves in the same direction.

When the zoom lever 4 is slidingly moved by a pressing operation in the arrow A or B direction, a resistance signal output from the zoom switch 14 varies according to the amount of slide movement of the zoom lever 4. The resistance signal is supplied through the flexible board 16 to a controller (shown at 22 in FIG. 9) mounted on a main board (shown at 21 in FIG. 9) in the camera body 1. When the slide operation of the zoom lever 4 is released, the zoom lever 4 is returned to a center position in an interlocked manner with self-reset of the actuator 14a to a center position.

The mode switch 15 is implemented by a push switch. When an actuator 15a of the mode switch 15 is pressed in the arrow C direction, a detection signal indicating that the zoom lever 4 reaches the second neutral position is output from the mode switch 15 through the flexible board 16 to the controller 22 on the main board 21.

On the front surface of the holding member 12, there are provided two grooves 12b extending parallel to the slide direction of the actuator 14a of the zoom switch 14 and apart from each other in the arrow C direction. On the rear surface of the zoom cover 11, two guide ribs 11d, 11e are formed so as to be apart from each other in the slide direction of the actuator 14a by a distance slightly larger than the width of the holding member 12. When one of the two grooves 12b of the holding member 12 is aligned in position with the guide ribs 11d, 11e of the zoom cover 11, the zoom lever 4 becomes capable of being slidingly operated in the arrow A or B direction.

The holding member 12 is assembled such that an L-shaped portion 12d provided at a front end portion of the holding member 12 is in abutment with a projection 13b, which is provided on a side of the pressing member 13 opposite from the central guide rod 13a among the three guide rods 13a of the pressing member 13. At the first neutral position, the zoom lever 4 is urged by the compression coil spring 18 in a direction opposite from the arrow C direction, and a rear end 4f of the protrusion 4d is aligned in position with a rear end surface 11f of the hole 11a of the zoom cover 11.

Figure 9:
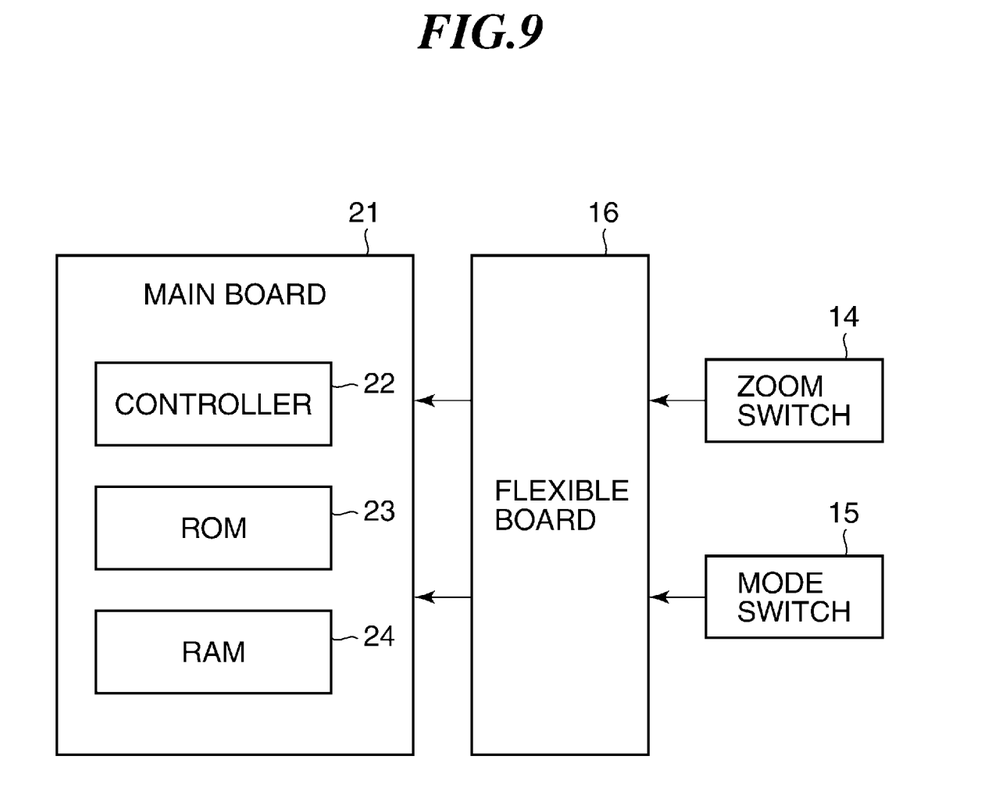
FIG. 9 is a schematic block diagram showing a control unit of the digital video camera, together with peripheral elements.

The controller 22 develops in a RAM 24 a control program stored in a ROM 23 or the like, and controls in accordance with the control program a zoom operation of the digital video camera based on the resistance signal output from the zoom switch 14 and the detection signal output from the mode switch 15.

When not supplied from the mode switch 15 with the detection signal indicating that the zoom lever 4 reaches the second neutral position, the controller 22 determines that the zoom lever 4 is in a state capable of being slidingly operated from the first neutral position in the arrow A or B direction, and controls the zoom speed in a first zoom mode based on an amount of movement of the zoom lever 4. Specifically, in accordance with the relation of FIG. 4 between the zoom speed and the amount of movement of the zoom lever in the first zoom operation, the controller 22 controls the zoom speed based on the resistance signal from the zoom switch 14 that represents the amount of slide movement of the zoom lever 4.

When receiving the detection signal from the mode switch 15, the controller 22 determines that the zoom lever 4 is in a state capable of being slidingly operated from the second neutral position in the arrow A or B direction, and controls the zoom speed in a second zoom mode based on the amount of movement of the zoom lever 4. More specifically, in accordance with the relation of FIG. 4 between the zoom speed and the amount of movement of the zoom lever in the second zoom operation, the controller 22 controls the zoom speed based on the resistance signal from the zoom switch 14.

Figure 7:
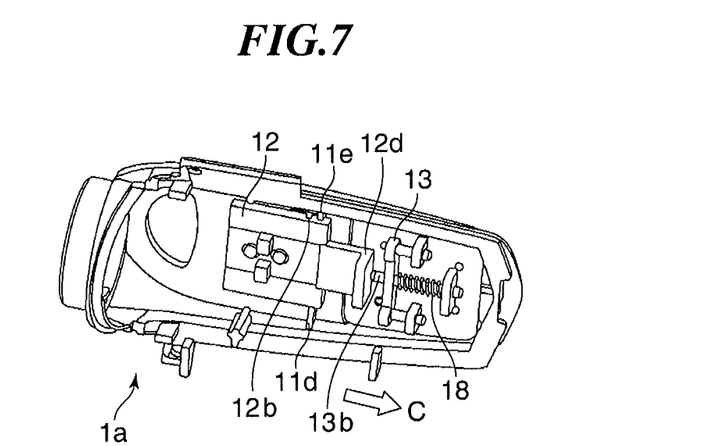
FIG. 7 is a perspective view showing an essential part of the zoom operation unit in a state that the zoom lever is at the first neutral position.
Figure 8:
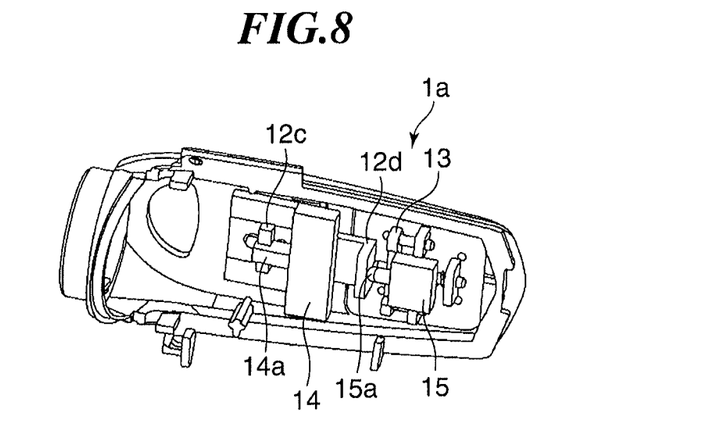
FIG. 8 is a perspective view showing the essential part of the zoom operation unit in a state that the zoom lever is at the second neutral position.

FIGS. 7 and 8 respectively show, in perspective views, an essential part of the zoom operation unit 1a in a state that the zoom lever 4 is at the first neutral position and in a state that the zoom lever 4 reaches the second neutral position.

As shown in FIG. 7, when the zoom lever 4 is at the first neutral position, the L-shaped portion 12d of the holding member 12 is in abutment with the projection 13b of the pressing member 13 and the zoom lever 4 is urged by the compression coil spring 18 in the direction opposite from the arrow C direction, as previously described.

At that time, the front-side groove 12b among the two grooves 12b of the holding member 12 is aligned in position with the guide ribs 11d, 11e of the zoom cover 11, so that the zoom lever 4 can be slidingly operated in the arrow A or B direction from the first neutral position, i.e., the first zoom operation can be performed.

When the zoom lever 4 is slidingly operated from the first neutral position in the arrow A or B direction, the guide ribs 11d, 11e of the zoom cover 11 are kept fitted into the front-side groove 12b of the holding member 12, so that the zoom lever 4 is suppressed from moving in the arrow C direction, i.e., the slide operation of the zoom lever 4 to the second neutral position is suppressed. Thus, the user is prevented from unintentionally moving the zoom lever 4 in the arrow C direction during the first zoom operation, whereby switchover from the first zoom operation to the second zoom operation against the user's intention can be prevented. The groove 12b of the holding member 12 and the guide ribs 11d, 11e of the zoom cover 11 are an example of a restriction unit of this invention.

The zoom lever 4 reaches the second neutral position, if the zoom lever 4 is slidingly moved from the first neutral position in the arrow C direction against the urging force of the compression coil spring 18 until the front end 4g of the protrusion 4a of the zoom lever 4 is aligned in position with a front end surface 11g of the hole 11a of the zoom cover 11.

When the zoom lever 4 reaches the second neutral position, the guide ribs 11d, 11e of the zoom cover 11 are aligned in position with the rear-side groove 12b among the two grooves 12b of the holding member 12, and the actuator 15a of the mode switch 15 is pressed by the L-shaped portion 12d of the holding member 12. Thus, the zoom lever 4 can be slidingly operated from the second neutral position in the arrow A or B direction, i.e., the second zoom operation can be performed.

During when the zoom lever 4 is being slidingly operated from the first neutral position in the arrow C direction, the zoom lever 4 cannot be slidingly operated in the arrow A and B directions. Thus, an unintentional zooming operation can be prevented during the slide operation of the zoom lever 4 in the arrow C direction.

When the zoom lever 4 is slidingly operated from the second neutral position in the arrow A or B direction, the guide ribs 11d, 11e of the zoom cover 11 are kept fitted in the rear-side groove 12b of the holding member 12. Thus, the zoom lever 4 is suppressed from moving in the direction opposite from the arrow C direction, i.e., the slide operation of the zoom lever 4 to the first neutral position is suppressed.

Accordingly, the user is prevented from unintentionally moving the zoom lever 4 in the direction opposite from the arrow C direction during the second zoom operation, whereby switchover from the second zoom operation to the first zoom operation against the user's intention can be prevented.

Since the width of the L-shaped portion 12d of the holding member 12 is greater than the amount of slide movement of the zoom lever 4 in the arrow A or B direction, the actuator 15a is kept pressed by the L-shaped portion 12d when the zoom lever 4 is slidingly operated in the arrow A or B direction from the second neutral position. Furthermore, the actuator 14a is kept held between the two protrusions 12c of the holding member 12 since the actuator 14a is longer than the amount of slide movement of the zoom lever 4 in the arrow C direction.

When the slide operation of the zoom lever 4 from the second neutral position is released, the zoom lever 4 is returned to the center position in an interlocked manner with the self-reset of the actuator 14a to the center position, and the engagement between the guide ribs 11d, 11e of the zoom cover 11 and the groove 12b of the holding member 12 is released. Then, the zoom lever 4 is moved by the urging force of the compression coil spring 18 in the direction opposite from the arrow C direction, so that the rear end 4f of the protrusion 4d is aligned in position with the rear end surface 11f of the hole 11a of the zoom cover 11, and the zoom lever 4 returns to the first neutral position where the first zoom operation can be performed.

As described above, in this embodiment, during the first zoom operation in which the zoom lever 4 is slidingly operated in the arrow A or B direction from the first neutral position, the zoom speed is controlled by the controller 22 in the first zoom mode based on the amount of movement of the zoom lever 4. During the second zoom operation in which the zoom lever 4 is slidingly operated in the arrow A or B direction from the second neutral position, the zoom speed is controlled by the controller 22 in the second zoom mode based on the amount of movement of the zoom lever 4. The amount of change of zoom speed relative to the amount of movement of the zoom lever 4 is made smaller in the second zoom mode than in the first zoom mode. It is therefore possible to change the zoom speed in a wide range in accordance with the amount of slide movement of the zoom lever 4 in the arrow A or B directions, without oversizing the zoom lever 4.

Moreover, in this embodiment, the movement of the zoom lever 4 in the arrow C direction is restricted during the first zoom operation, and the movement of the zoom lever 4 in the direction opposite from the arrow C direction is restricted during the second zoom operation. Further, the movement of the zoom lever 4 in the arrow A or B direction is restricted during the movement in the arrow C direction. Thus, without causing erroneous operation of the zoom lever 4, excellent operability can be ensured.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2010-275776, filed Dec. 10, 2010, which is hereby incorporated by reference herein in its entirety.

What is claimed is:

1. An image pickup apparatus having a zoom function, comprising:
   a zoom lever configured to be movable from a first neutral position in a first direction, configured to be movable from the first neutral position in a second direction that is an opposite direction of the first direction, configured to be movable from the first neutral position to a second neutral position in a third direction that is different from the first and second directions, configured to be movable from the second neutral position in the first direction, and configured to be movable from the second neutral position in the second direction; and
   a control unit configured to control a zoom speed in a first zoom mode based on an amount of movement of the zoom lever in a case where the zoom lever is moved from the first neutral position in the first or second direction and configured to control the zoom speed in a second zoom mode based on the amount of movement of the zoom lever in a case where the zoom lever is moved from the second neutral position in the first or second direction,
   wherein an amount of change of the zoom speed relative to the amount of movement of the zoom lever in the first zoom mode differs from that in the second zoom mode.

2. The image pickup apparatus according to claim 1, further including:
   a restriction unit configured to restrict a movement of the zoom lever in the third direction when the zoom lever is moved from the first neutral position in the first or second directions, and configured to restrict a movement of the zoom lever in a direction opposite from the third direction when the zoom lever is moved from the second neutral position in the first or second directions.

3. The image pickup apparatus according to claim 1, further including:
   an urging member configured to urge the zoom lever toward the first neutral position when the zoom lever is in the second neutral position.

4. The image pickup apparatus according to claim 1, wherein the control unit makes the amount of change of the zoom speed relative to the amount of movement of the zoom lever smaller in the second zoom mode than in the first zoom mode.

5. The image pickup apparatus according to claim 1, wherein the third direction is perpendicular to both the first and second directions.

6. An image pickup apparatus having a zoom function, comprising:
   a zoom member configured to be movable from a first neutral position in a first direction, configured to be movable from the first neutral position in a second direction that is an opposite direction of the first direction, configured to be movable from the first neutral position to a second neutral position in a third direction that is different from the first and second directions, configured to be movable from the second neutral position in the first direction, and configured to be movable from the second neutral position in the second direction; and
   a control unit configured to control a zoom speed in a first zoom mode based on an amount of movement of the zoom member in a case where the zoom member is moved from the first neutral position in the first or second direction and configured to control the zoom speed in a second zoom mode based on the amount of movement of the zoom member in a case where the zoom member is moved from the second neutral position in the first or second direction,
   wherein an amount of change of the zoom speed relative to the amount of movement of the zoom member in the first zoom mode differs from that in the second zoom mode.

7. The image pickup apparatus according to claim 6, further including:

a restriction unit configured to restrict a movement of the zoom member in the third direction when the zoom member is moved from the first neutral position in the first and second directions, and configured to restrict a movement of the zoom member in a direction opposite from the third direction when the zoom member is moved from the second neutral position in the first and second directions.

8. The image pickup apparatus according to claim 6, further including:

an urging member configured to urge the zoom member toward the first neutral position when the zoom member is in the second neutral position.

9. The image pickup apparatus according to claim 6, wherein the control unit makes the amount of change of the zoom speed relative to the amount of movement of the zoom member smaller in the second zoom mode than in the first zoom mode.

10. The image pickup apparatus according to claim 6, wherein the third direction is perpendicular to both the first and second directions.

\* \* \* \* \*